Jan. 19, 1943.           T. E. BOYLE              2,309,042
                    METHOD OF TREADING TIRES
                    Filed Aug. 19, 1941          2 Sheets-Sheet 1
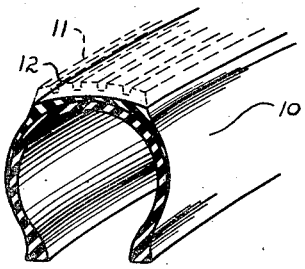
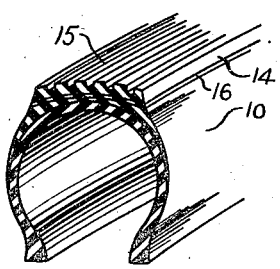
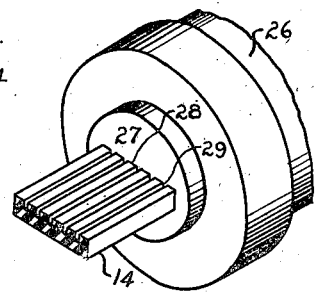
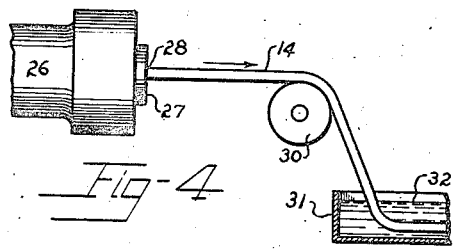
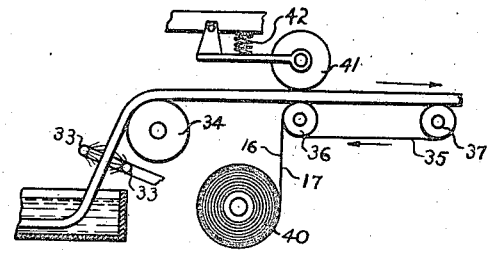
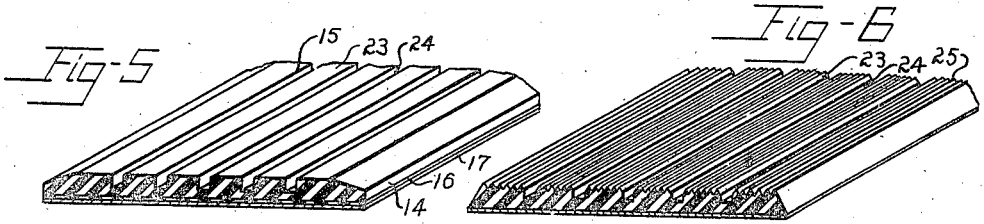
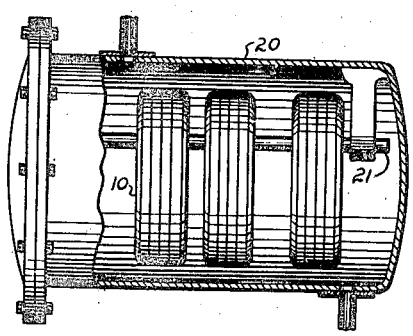
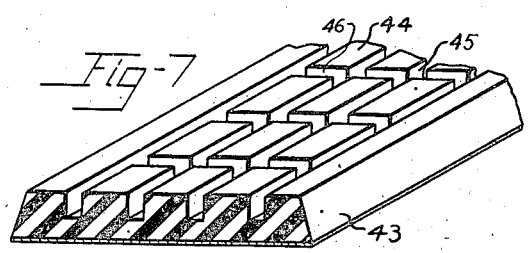
Inventor
Thomas E. Boyle Jan. 19, 1943. T. E. BOYLE 2,309,042
METHOD OF TREADING TIRES
Filed Aug. 19, 1941   2 Sheets-Sheet 2
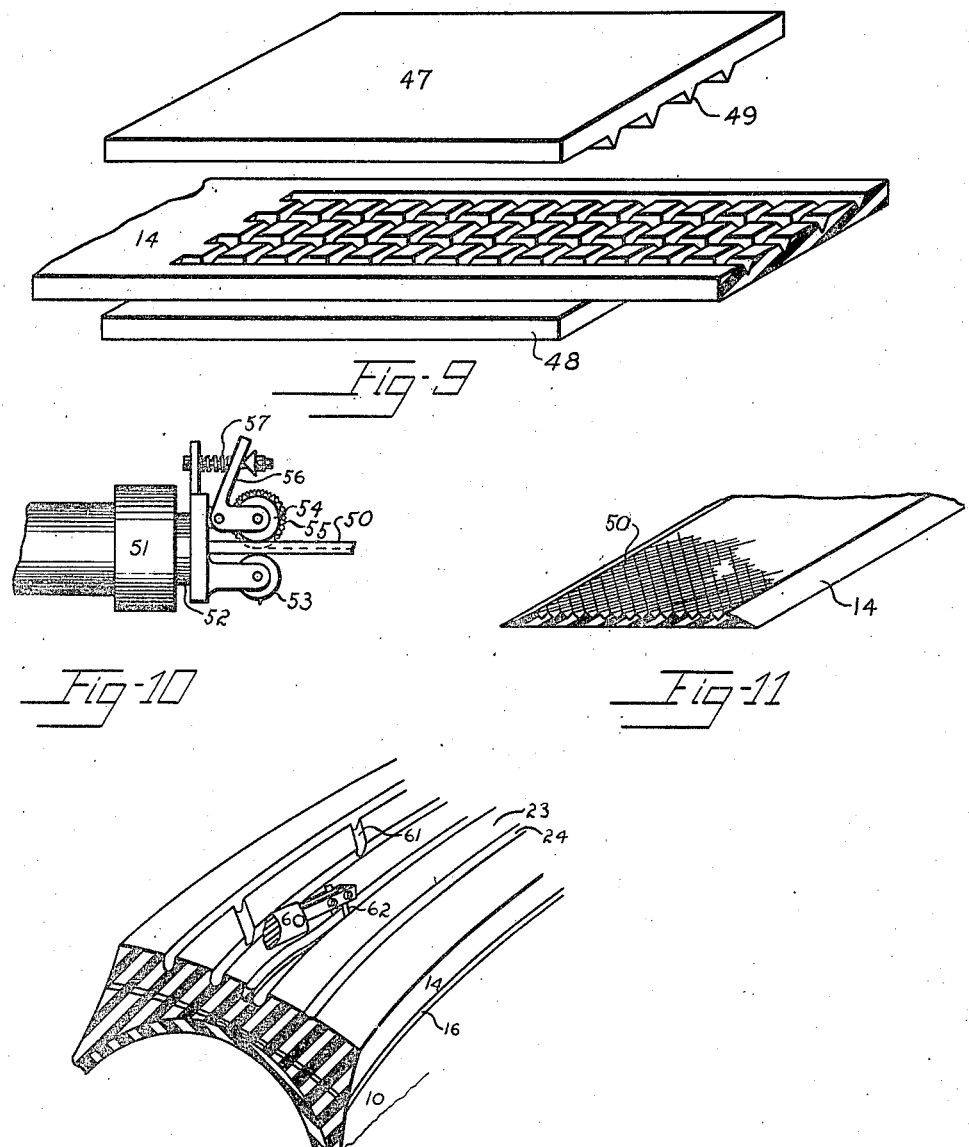

Patented Jan. 19, 1943

2,309,042

UNITED STATES PATENT OFFICE 2,309,042

METHOD OF TREADING TIRES

Thomas E. Boyle, Cuyahoga Falls, Ohio, assignor to The B. F. Goodrich Company, New York, N. Y., a corporation of New York Application August 19, 1941, Serial No. 407,435

5 Claims. (Cl. 18—59)

This invention relates to the treading of rubber tires and is especially useful in the retreading of tires which have become worn.

In the manufacture of pneumatic tire casings it has been customary to prepare by calendering or by extruding a smooth-faced slab of unvulcanized rubber material in slab form. These slabs have been assembled with other materials to form a tire casing having a smooth outer face. The tire casing is then vulcanized in a closed mold having an engraved design surface and the rubber is molded to form the tread design during vulcanization.

When the treads have become worn and the carcass of the tire casing remains in good condition it has been customary to remove all or part of the tread rubber and to replace it with new rubber by retreading or recapping the tire. In the recapping process it has been proposed merely to remove the relatively flat tread face of the old tire and replace it by a smooth faced layer of new rubber commonly called "camel-back" in the trade. To provide a tread other than smooth it has been necessary either to mold the design in the recapped tire at considerable expenditure of labor and with cumbersome mold equipment or it has been necessary to cut the entire design with a grooving tool after vulcanization of the tread with great waste of vulcanized rubber and considerable expenditure of time.

This invention aims to overcome the foregoing difficulties and to provide an improved product and method of procedure.

The principal objects of the invention are to provide an unvulcanized tread slab having a design formed in its tread face, to provide for applying and vulcanizing the tread without disturbing the preformed design, to reduce waste of rubber material, and to provide for the recapping of tires with a contoured tread and with a minimum expenditure of labor and equipment.

These and other objects will appear from the following description and the accompanying drawings.

Of the drawings:

Fig. 1 is a perspective view of a section of a worn tire casing, the dot and dash lines indicating the original size and shape of the tread.

Fig. 2 is a similar view showing a tread applied thereto and embodying the invention.

Fig. 3 is a perspective view of the head of an extruding machine with a tread slab issuing therefrom.

Fig. 4 is a diagrammatic view of apparatus for carrying out the invention.

Fig. 5 is a perspective view of a tread slab embodying the invention.

Fig. 6 is a similar view showing another tread slab embodying the invention.

Fig. 7 is a similar view showing still another form of tread slab embodying the invention.

Fig. 8 is a sectional view of a vulcanizer showing the vulcanizing step.

Fig. 9 is a perspective view of a mold showing a tread slab embodying the invention and illustrating modification of the procedure.

Fig. 10 is a side elevation of a modified extruding machine for forming a tread slab of the invention.

Fig. 11 is a perspective view of the tread slab produced by the apparatus of Fig. 10.

Fig. 12 is a fragmentary perspective view showing the use of a grooving tool in deepening the tread grooves and producing additional grooves.

In accordance with the invention a slab of unvulcanized rubber or other rubber-like material is formed with a nonskid or decorative tread surface and is adhered to a tire casing and vulcanized without material alteration of its tread surface. The tread may be provided with additional design elements by grooving the preformed tread after vulcanization thereof, although this is not essential.

Referring to the drawings, the numeral 10 designates a pneumatic tire casing which has been worn through use, the original shape of the tire being indicated by the dot and dash lines. The tread face, indicated by the numeral 11, has been worn away and the tire now presents a smooth worn face 12. In practicing the present invention the face 12 is prepared for retreading by buffing and cementing it. When the surface is worn unevenly or the tread is loose, the loose or projecting portions may be cut away and the surface buffed to a cylindrical or substantially cylindrical surface.

A new tread slab 14 having a nonskid or decorative design 15 formed in the unvulcanized tread material is then adhered over the prepared surface. For this purpose it is desirable to provide the tread slab with a layer 16 of tacky rubber on its attaching face and prior to applying the tread the tacky may be protected from dust by a protective layer 17 of varnished cambric, holland cloth, or the like. After the tread slab is laid in place on the tire and its ends spliced to each other by cutting and cementing them, it is rolled into intimate contact with the old rubber and due to the nature of the tread composition this may be done without material alteration of the design surface. When rollers are used to roll the tread in place under great pressure, the rollers may be contoured to a shaped complementary to that of the tread face but the tread material is ordinarily quite stiff so that this is not ordinarily necessary, especially when the tacky layer 16 is employed to provide good adhesion with relatively light pressure.

After the tread slab is applied, the tire casing with the new tread thereon is placed in an open steam vulcanizer 20 and subjected to direct pressure and heat for a sufficient time to vulcanize the tread. In the vulcanizer the tire casings may be supported by a bar 21 passing therethrough and no rims, curing bags, molds, or wrappings are required so that the heated tread does not contact with anything but the steam employed in vulcanizing and therefore is not distorted.

Where the desired design consists simply of longitudinal design elements such as the ribs 23 and grooves 24 of the slab of Figs. 5 and 6 or the fine serrations 25 on the ribs 24 of Fig. 6, the slab may be simply formed by extrusion. Referring to Figs. 3 and 4, the numeral 26 designates a tubing machine having an extrusion die 27. The die is formed with an aperture 28 of such shape as to provide a tread slab of the desired cross-sectional shape, and dentations 29 of the die form the desired grooves 24 of the slab. Rubber material is fed through the machine and is extruded to form. The newly formed slab is soft and hot, having little strength. It is led over a roller 30 into a cooling tank 31 where it is hardened and cooled by passing it through cold water 32. Upon emerging from the cooling tank, the water is dried therefrom by jets, 33, 33 which direct an air blast against its surfaces. The dried slab passes over a roller 34 and onto a conveyor belt 35 supported by pulleys 36, 37.

When an adhesive layer 16 of cushion rubber is to be assembled with the slab, the cushion rubber is calendered onto the varnished cambric 17. A roll 40 of the cushion gum on the cambric is mounted on a rotatable support near the conveyor and its leading end is fed over the conveyor belt 35 in contact with the tread slab 14. A pressure roller 41 is supported above the conveyor and a spring 42 presses the roller firmly against the tread slab to unite the cushion rubber to the slab.

When the desired tread design is such as not to permit complete forming of the slab by extrusion, as in the slab 43 of Fig. 7 where the design shows tread blocks 44 separated by longitudinal grooves 45 and cross-grooves 46, the tread slab may be extruded as a plain or as a longitudinally grooved slab and may then be fed intermittently between mold members 47, 48 as in Fig. 9. The molds are mounted in a hydraulic or other press and are heated. One of the mold members has ribs 49 for forming the grooves in the slab by being forced thereinto. Pressure is applied only long enough to form the grooves and set the rubber to shape without vulcanizing the slab, and the slab is fed step by step through the press. After the pressing operation or therebefore, the cushion rubber layer may be applied to the smooth face of the slab.

Where the preferred design is relatively shallow, as in Fig. 11 where the tread surface is knurled as at 50, such a shallow design may be formed as shown in Fig. 10 where an extruding machine 51 is provided with a die 52 shaped to form a slab having a plain face. A roller 53 is rotatably supported at the mouth of the die and a second roller 54 having a knurled face 55 complementary to the desired design is mounted on a swing arm 56 pressed by a spring 57 against the face of the slab supported by the roll 53. The design is progressively rolled into the soft warm slab as it is extruded.

After the new tread has been vulcanized to the tire, the grooves 24 may be deepened if desired by use of a grooving tool 60, or additional grooves, such as the cross-grooves 61, may be cut in the tread. The tool 60 comprises a knife 62 of loop form supported by a heating unit. Such an operation is not necessary, however, when the grooves are formed of sufficient depth in the original slab with a saving of material. When, however, additional grooves are required, the grooves 24 provided by extrusion or molding of the vulcanized slab may be used as guides or indicia for operating the grooving tool.

The described method of forming the unvulcanized slab conserves rubber material as it avoids waste of rubber by groove cutting after vulcanization and the vulcanization of the tread on the tire without the use of wrappings or molds preserves the design of the tread slab while the design of the tread surface, especially where the fine serrations 25 or knurling 50 are employed makes less noticeable defects of surface due to processing of the rubber composition.

Variations may be made without departing from the scope of the invention as it is defined by the following claims.

I claim:

1. The method of treading a tire which comprises forming a slab of rubber-like material with shallow grooves in its tread face, adhering the slab to the tread surface of a tire, vulcanizing the slab in place with its tread surface unconfined, and grooving the tread of the finished tire while employing the shallow grooves as a guide.

2. The method of treading a tire comprising forming a slab of unvulcanized rubber-like material, pressing the slab to form an embossed design on the tread face while it is maintained in its unvulcanized condition, adhering the unvulcanized embossed slag to the tread surface of a tire, and vulcanizing the tread upon the tire with its tread surface exposed directly to heated pressure fluid.

3. The method of treading a tire comprising forming a slab of unvulcanized rubber-like material, pressing the slab between mold members to form an embossed grooved design on the tread face of the slab while it is maintained in its unvulcanized condition, adhering the slab to the tread surface of a tire, vulcanizing the tread upon the tire with its tread surface exposed directly to heated pressure fluid, and deepening the grooves in the tread after vulcanization.

4. The method of treading a tire which comprises forming a slab of rubber-like material with shallow grooves in its tread face, adhering the slab to the tread surface of a tire, vulcanizing the slab in place with its tread surface unconfined, and deepening the grooves of the tire by removal of vulcanized material while employing the shallow grooves as a guide.

5. The method of treading a tire which comprises forming a slab of rubber-like material with shallow grooves in its tread face, adhering the slab to the tread surface of a tire, vulcanizing the slab in place with its tread surface unconfined, and forming additional grooves in the vulcanized tread while employing the shallow grooves as a guide.

THOMAS E. BOYLE.

CERTIFICATE OF CORRECTION.

Patent No. 2,309,042.                                    January 19, 1943.

THOMAS E. BOYLE.

It is hereby certified that error appears in the printed specification of the above numbered patent requiring correction as follows: Page 1, second column, line 42, after "tacky" insert --face--; page 2, second column, line 40, for "slag" read --slab--; and that the said Letters Patent should be read with this correction therein that the same may conform to the record of the case in the Patent Office.

Signed and sealed this 9th day of March, A. D. 1943.

Henry Van Arsdale,
Acting Commissioner of Patents.

(Seal)